April 27, 1926.
D. E. DUNLAP
FITTING FOR AIRPLANES
Filed Dec. 26, 1925
1,582,587
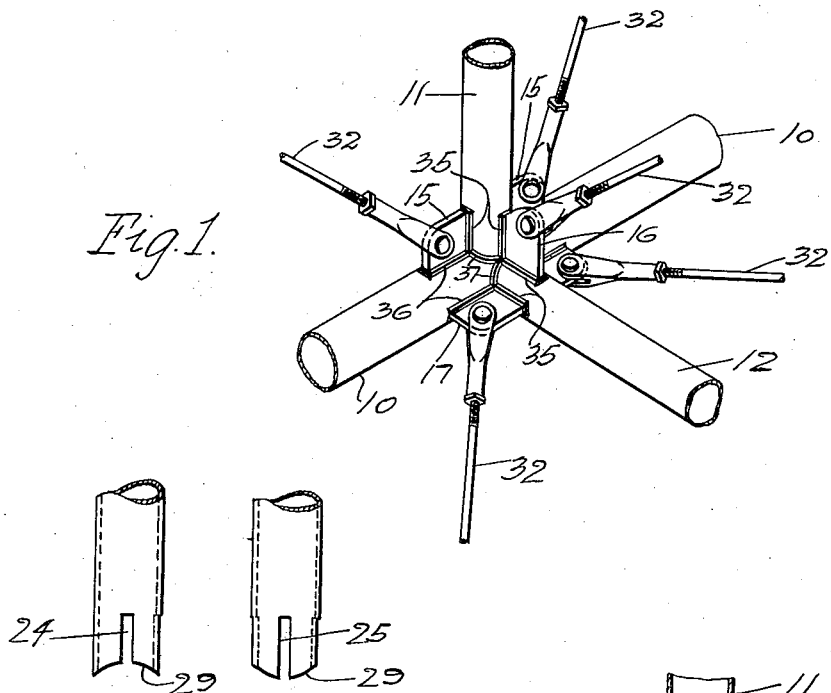
Fig. 1.
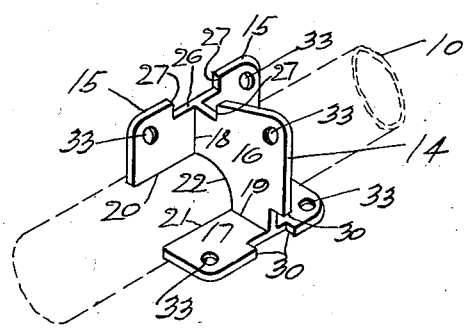
Fig. 2.   Fig. 3.
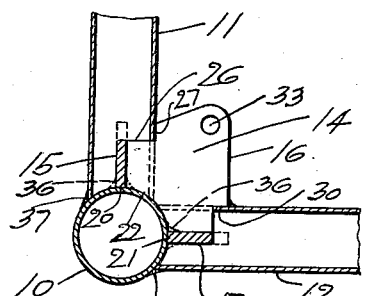
Fig. 5.
Fig. 4
INVENTOR
David Earle Dunlap
Parker & Prochnow
ATTORNEYS Patented Apr. 27, 1926.

1,582,587

UNITED STATES PATENT OFFICE.

DAVID EARLE DUNLAP, OF BUFFALO, NEW YORK, ASSIGNOR TO G. ELIAS & BRO., INC., OF BUFFALO, NEW YORK.

FITTING FOR AIRPLANES.

Application filed December 26, 1925. Serial No. 77,724.

*To all whom it may concern:*

Be it known that I, DAVID EARLE DUNLAP, a citizen of the United States, residing at Buffalo, in the county of Erie and State of New York, have invented a new and useful Improvement in Fittings for Airplanes, of which the following is a specification.

This invention relates to fittings for use in connection with airplane constructions and particularly to fittings of this kind used in connection with a welded or brazed joint.

The objects of this invention are to provide a fitting of this kind which is so constructed as to relieve the welded or brazed joint of a large part of the strain which would otherwise fall on this joint; also to provide a fitting of this kind which is formed of parts which interlock with struts of the frame construction in such a way as to relieve the welded or brazed joints of some of the strains; also to improve the construction of fittings of this kind in other respects hereinafter specified.

In the accompanying drawings,

Fig. 1 is a perspective view of an airplane fitting embodying my invention.

Fig. 2 is a fragmentary, side elevation of the bottom of a strut used in connection with my fitting.

Fig. 3 is another side elevation thereof, taken at right angles to the view shown in Fig. 2.

Fig. 4 is a perspective view of the gusset member of the fitting showing the same applied to a longitudinal frame member of the airplane, the longitudinal frame member being shown in broken lines.

Fig. 5 is a fragmentary, transverse, sectional elevation of the frame of an airplane provided with my improved fitting.

The accompanying drawings show my invention applied to a part of the fuselage frame of an airplane where two strut members are to be secured to a longitudinal member. It will be understood, however, that my improved fitting may be applied to any portion of the frame of an airplane where two or more members are to be secured together.

Referring to Figs. 1 and 5, 10 represents a structural member of an airplane, hereinafter, for sake of convenience, referred to as a longitudinal member, although this member need not necessarily extend lengthwise of the airplane, and 11 and 12 represent strut members, the ends of which are to be secured to an intermediate portion of the longitudinal member 10. These longitudinal and strut members may be of any suitable construction or form, being preferably made of metal tubes. In order to secure the ends of the two struts 11 and 12 to the longitudinal member 10 a gusset member 14 is employed which is preferably provided with parts adapted to enter into slots or recesses in the ends of the struts and with other parts adapted to lie against the longitudinal member, the various parts of the gusset member being provided with apertures to which tension members or cables may be secured. In the particular construction shown the gusset member 14 is made up of three gusset plates 15, 16 and 17, the two plates 15 and 17 being arranged in planes at right angles to each other and parallel to the longitudinal member, and the gusset connecting plate 16 forming a connection between the two plates and extending at right angles to both of these plates. In the particular construction shown the two edges 18 and 19 of the gusset plate 16 are adapted to be secured against the side faces of the gusset plates 15 and 17 to form the gusset member 14. These gusset plates may be secured together in any suitable manner, preferably by welding, and this construction has the advantage that the weld or seam between the three gusset plates can be effected so that these welded edges can be inspected or tested before the gusset member is assembled in the frame of an airplane. The plates 15 and 17 are provided with edges 20, 21 adapted to be placed directly against the longitudinal member 10 and to be secured thereto, and the inner edge 22 of the gusset plate 16 is shaped to conform to the contour of the outer surface of the portion of the longitudinal member 10 to which this fitting is to be attached. In the particular construction shown the longitudinal member 10 is circular in cross section, but it will be understood that this member may be of any suitable or desired shape and the edge 22 of the gusset plate 16 is made to correspond with the peripheral surface of this member.

The strut member 11 is provided at its end adjacent to the longitudinal member 10 with a slot 24 extending lengthwise of the longitudinal member and into which a part of the gusset plate 15 is adapted to enter, 11 and another slot 25 extending transversely of the slot 24 is also provided in this end of the strut, into which a part of the connecting gusset plate 16 may enter when the strut member 11 is positioned relatively to the longitudinal member. In order to further insure the holding of the strut in correct relation to the gusset member and to prevent relative movement between these two parts, the portions of the gusset member which are engaged by the strut 11 are recessed as shown at 26, forming shoulders 27 on the gusset plates 15 and 16 between which the lower portion of the strut is adapted to enter to hold the same in correct relation to the gusset member independently of any welded connections between these parts. The lower edge 29 of the strut member is preferably shaped, as shown in Figs. 2 and 3, so as to correspond to the periphery of the portion of the longitudinal member with which this end of the strut engages.

The strut member 12 is similarly formed, being provided with slots into which portions of the gusset plates 16 and 17 are adapted to enter and these gusset plates are provided with recesses in their outer edges forming shoulders 30 which are adapted to hold the strut 12 in place relatively to the gusset member.

In order to provide for the attachment of the tension members or wires 32, the portions of the gusset plates which extend beyond the struts are provided with apertures 33 to which the ends of the tension members may be connected in any suitable or desired manner. It will be obvious that the tension members or wires 32 may be replaced by compression members, such as tubes, struts or the like, so that the fitting is applicable to rigid trusses.

After the fitting has been assembled by placing the various struts into correct relation to the gusset member 14 and correctly positioning the gusset member with reference to the longitudinal member 10 of the airplane frame, the various contacting edges of the gusset member with the struts and longitudinal member are welded. For example, welded connections 35 are formed along the edges of the slotted part of the strut members 11 and 12 and the adjacent portions of the gusset member 14. Similar welded connections 36 are formed at the junctions of the edge portions 20, 21 of the gusset member 14 and the longitudinal member 10, and welded connections 37 are formed at the junction of the ends of the strut members 11 and 12 with the longitudinal member 10.

By means of the fitting described the tension of any of the wires 32 is transmitted through a gusset plate directly to the strut members 11 or 12 by means of the interfitting connection between the gusset plate and the ends of the struts 11 or 12, independently of the welded connections 35. Since the strains which are transmitted from the struts 11 and 12 and the tension members or wires 32 to the longitudinal member are comparatively small, the welded connections 36 and 37 transmit but little of the strains or stresses to which the airplane frame is subjected. The welded connections 35 serve mainly to strengthen the end portions of the struts 11 and 12 and to compensate for the weakening of these members by the slots therein into which the gusset members extend. Furthermore since the welded connections between the gusset plates of the gusset member are made before the fitting is assembled in the frame of an airplane, these connections can be tested and inspected before the assembly, and the other welded connections between the struts and longitudinal member, and between these members and the gusset member are all visible where they can be easily inspected, so that a strong and reliable fitting results.

I claim as my invention:—

1. In a fitting for airplanes, the combination of a frame member, a strut member having its end abutting against said frame member and having a slot in the end thereof extending substantially lengthwise of said frame member, a gusset plate extending lengthwise of said frame member and having one edge of said gusset plate secured to said frame member lengthwise thereof and having a part extending into said slot, shouldered portions on said gusset member engaging said strut member at opposite sides thereof to prevent relative movement of said gusset plate and strut member, and tension members adapted to be connected with said gusset plate at opposite sides of said strut.

2. In a fitting for airplanes, the combination of a frame member, a pair of strut members terminating at the sides of said frame member and extending in different directions therefrom, said strut members having slots in the ends thereof extending substantially parallel to said frame member, and transversely extending slots, and a gusset member including plates arranged edgewise with reference to said frame member and extending into said first mentioned slots of said struts, and a connecting plate extending through the transverse slots of said struts and secured to said first mentioned plates, and means on said plates of said gusset member for securing tension members thereto.

3. In a fitting for airplanes, the combination of a frame member, a pair of strut members terminating at the sides of said frame member and extending in different directions therefrom, said strut members having slots in the ends thereof extending substantially parallel to said frame member, and transversely extending slots, and a gusset member including plates arranged edgewise with reference to said frame member and extending into said first mentioned slots of said struts, a connecting plate extending through the transverse slots of said struts and secured to said first mentioned plates, said plates having shouldered portions adjacent to the portions of said plates entering said slots and adapted to engage said struts to prevent relative movement of said struts and said plates, and means on said plates of said gusset member for securing tension members thereto.

4. A gusset member adapted to be secured to a longitudinal frame member of an airplane and including a pair of plates arranged to extend lengthwise of said longitudinal member and to have one edge of each plate secured to said longitudinal member and extending in different positions relatively to the axis of said longitudinal member, and a transversely extending connecting plate having its ends rigidly secured to said lengthwise plates, the intermediate portions of said longitudinal plates and the end portions of said connecting plate being adapted to enter into slots formed in strut members terminating in said longitudinal member, said plates being provided with means for connecting tension members thereto.

5. In an airplane fitting the combination of a longitudinal member and a pair of tubular strut members extending in different directions from said longitudinal member, a gusset member including a pair of plates arranged lengthwise of said longitudinal member and extending through slots provided in the ends of said strut members, and a connecting gusset plate extending transversely with reference to said other plates and secured thereto and also extending through slotted portions in the ends of said strut members, and welded connections at the joints of said plates with said longitudinal and strut members.

6. In an airplane fitting, the combination of a longitudinal tubular member, a pair of tubular strut members abutting against the sides of said longitudinal member and extending in different directions therefrom, and a gusset member including a pair of plates each having one edge thereof secured to said longitudinal member and each plate extending substantially parallel with a strut member, said strut members having slotted portions into which said plates extend, a transversely arranged gusset plate having its ends secured to said first mentioned plates and also extending through transverse slots in said strut members, the ends of said strut members being shaped to fit the periphery of said longitudinal member, and welded connections between the plates of said gusset members and between the junctures of said gusset member with said longitudinal member and strut members, and tension members connected to the portions of said gusset member extending beyond said strut members.

7. In an airplane fitting, the combination of a longitudinal tubular member, a pair of tubular strut members abutting against the sides of said longitudinal member and extending in different directions therefrom, and a gusset member including a pair of plates each having one edge thereof secured to said longitudinal member and each plate extending substantially parallel with a strut member, said strut members having slotted portions into which said plates extend, a transversely arranged gusset plate having its ends secured to said first mentioned plates and also extending through transverse slots in said strut members, the ends of said strut members being shaped to fit the periphery of said longitudinal member, shouldered portions on the parts of said plates extending out of said slots and adapted to abut against said strut members to hold said strut members in correct relation to said gusset member, and welded connections between the plates of said gusset member and between the junctures of said gusset member with said longitudinal member and strut members, and tension members connected to the portions of said gusset member extending beyond said strut members.

DAVID EARLE DUNLAP.